United States Patent
Guerinon et al.

(10) Patent No.: US 7,051,779 B2
(45) Date of Patent: May 30, 2006

(54) EXTENDED-MOBILITY TIRE WITH ANCHORING ZONE OF SUBSTANTIALLY LOW MODULUS

(75) Inventors: Bernard Guerinon, Clermont-Ferrand (FR); Jean-Jacques Drieux, Volvic (FR); James Robert Anderson, Simpsonville, SC (US); David Jardine, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/131,414

(22) Filed: May 18, 2005

(65) Prior Publication Data
US 2005/0263232 A1    Dec. 1, 2005

Related U.S. Application Data

(63) Continuation of application No. PCT/EP03/11992, filed on Oct. 29, 2003.

(30) Foreign Application Priority Data
Nov. 18, 2002  (FR) ................................. 02 14483

(51) Int. Cl.
*B60C 15/00* (2006.01)
*B60C 15/02* (2006.01)

(52) U.S. Cl. ............... 152/544; 152/539; 152/547; 152/550

(58) Field of Classification Search ............. 152/539, 152/543, 544, 547, 550
See application file for complete search history.

(56) References Cited

U.S. PATENT DOCUMENTS

| 6,659,149 | B1 * | 12/2003 | Pereira et al. | 152/544 |
| 2005/0016655 | A1 * | 1/2005 | Pereira et al. | 152/544 |

FOREIGN PATENT DOCUMENTS

| WO | WO 99/64225 A1 | 12/1999 |
| WO | WO 01/39999 A2 | 6/2001 |

* cited by examiner

*Primary Examiner*—Adrienne C. Johnstone
(74) *Attorney, Agent, or Firm*—Buchanan Ingersoll PC

(57) ABSTRACT

A tire comprising two sidewalls, beads, a reinforcement structure extending radially from each of the beads towards the crown zone, at least one of said beads comprising:
   a bead seat of inverted type;
   an anchoring zone for the reinforcement structure in said bead, comprising an arrangement of circumferential cords, a bonding mix being arranged between the circumferential cords and the reinforcement structure, said bonding mix of the anchoring zone having a elasticity modulus at a deformation of 10% of less than 20 MPa and preferably between 10 and 20 MPa;
   an axially outer zone arranged in the zone of the bead;
   a bearing zone for said bead.

The anchoring rubber mix makes it possible, in spite of its rigidity which is very much less than what was advocated previously, to retain very satisfactory endurance properties.

15 Claims, 3 Drawing Sheets

EXTENDED-MOBILITY TIRE WITH ANCHORING ZONE OF SUBSTANTIALLY LOW MODULUS

This application is a continuation of International Application Serial No. PCT/EP03/011992 filed on Oct. 29, 2003, and which published on Jun. 3, 2004 under Publication No. WO 2004/045873.

The present invention relates to a tire for a vehicle wheel in which at least one of the beads comprises a seat having a generatrix, the axially inner end of which lies on a circle of diameter greater than the diameter of the circle on which the axially outer end is located. This type of design is particularly suited to the new generations of tires which can be used, within certain limits, in conditions of low pressure, or even zero or virtually zero pressure, with the risk of separation of the tire from the rim on which it is mounted being eliminated. This concept is frequently designated by the expression "extended mobility".

For a long time, tire manufacturers have been trying to develop a tire which does not create any source of risk or potential danger in the event of an abnormal drop in, or even total loss of, pressure. One of the difficulties encountered relates to travelling with a flat tire or at very low pressure, because, when travelling at very low pressure, or even at zero pressure, with conventional tires, the beads are at great risk of separating from the periphery of the rim against which they were held by the pressure.

Numerous solutions have been tested in order to overcome these disadvantages. Frequently, these solutions cause additional difficulties in mounting and demounting the tire on/from the rim.

Furthermore, the clamping function of the tire on the rim is an essential function for ensuring the qualities of the tire in operation, because it directly or indirectly affects many aspects such as mounting (sometimes referred to as "clipping") or fastening of the tire, the airtightness of the tire, rotation on rim, etc. These functions are all important and require specific characteristics and rigorous manufacture of the products, in particular if high quality standards are desired. Now, the rims and tires frequently, for one and the same dimensional code, have slightly different actual dimensions, mainly due to the manufacturing tolerances. These dimensional variations make it more difficult to comply with the various functions listed above.

Two major types of solution are used industrially to fulfil these functions. First of all, for traditional tires, the bead wire simultaneously performs all these functions.

More recently, for several types of products manufactured by the Applicant, the conventional bead wire has been replaced by an anchoring zone comprising in particular arrangements of circumferential cords cooperating with the carcass-type reinforcement structure via an anchoring or bonding mix. In this case too, the anchoring zone performs all the functions set forth above.

However, in both these cases, it is difficult to optimise certain parameters because, very often, an improvement in one parameter causes another to deteriorate. There are thus certain limits to making such compromises between a gain on one hand and a loss on another, since it is often difficult to tolerate poorer performance for certain aspects.

EP 0 582 196 discloses a tire comprising a tread extended by two sidewalls and two beads and also a carcass anchored in the two beads to an annular reinforcement. The carcass is formed of cords in an adjacent arrangement, which are aligned circumferentially and are in contact with at least one layer of bonding rubber of very high elasticity modulus in the hooking zone of the bead comprising the annular reinforcement. In this tire, the annular reinforcement of the hooking zone of the bead is formed of stacks of circumferential cords with interposition of a layer of bonding rubber of very high elasticity modulus between the reinforcement cords of the carcass and these stacks. This embodiment is intended for tires of conventional type, with the beads being held against the rim hook due to the inflation pressure of the tire. In this type of arrangement, there is a predominance of stresses of the lateral or axial type, which induces major compressive forces which act substantially axially from the walls towards the centre of said bead. These forces increase according to the inflation pressure. The increase in pressure tends to make the bead slide against the hook, radially towards the outside. The stresses induced radially towards the inside, against the seat of the rim, decrease with the increase in pressure, or with any increase in the tension of the carcass-type reinforcement structure.

It will furthermore be noted that the stacks of cords are aligned in a direction substantially parallel to the orientation of the profile of the rim hook against which the bead bears. The profile of the bead of this type of tire is relatively narrow and elongated; the anchoring is distributed over the major part of the height and width of the bead. The passage of the carcass into the bead is generally substantially central relative to the walls of said bead. Furthermore, when it is a relatively narrow bead subject to predominantly axial forces, neither the inflation pressure nor the tension induced in the carcass permits generation of large moments or torques, which tend to make the bead pivot or turn on itself.

With such a type of tire, if the pressure drops and the vehicle continues to travel, holding of the tire on the rim is no longer ensured, and in the majority of cases it rolls off the rim.

EP 0 673 324 describes a rolling assembly comprising at least one tire with a radial carcass reinforcement which is anchored within each bead and a rim of specific shaping. This rim comprises a first seat with a generatrix such that the axially outer end of said generatrix is distant from the axis of rotation by a length less than the distance between its axially inner end and is defined axially to the outside by a protrusion or rim flange. The tire comprises bead seats suitable for mounting on this rim. The type of tire/rim interface proposed in this document has many advantages compared with the solutions already known, in particular with regard to the ease of mounting/demounting, while making it possible to travel a certain distance despite a drop in pressure.

EP 0 748 287 describes a solution which permits initial optimisation of the basic technology described in EP 0 673 324 referred to above. This is a tire, at least one bead of which has a structure which makes it possible to modify the clamping of said bead according to the tension of the carcass reinforcement and in particular reinforcement thereof when the i inflation p pressure i increases to its rated value. The document thus proposes using a bead with anchoring of the end of the carcass by turning it up about the base of the bead wire, via the axially and radially inner sides relative to the bead wire. The bead also comprises, adjacent to the bead wire and axially to the outside thereof, a profiled element of rubber mix of relatively high hardness against which the bead wire can exert a compressive force when the tension of the carcass reinforcement increases. This compressive force creates self-clamping of the toe of the bead on the mounting rim. The tension of the carcass therefore involves displacement of the bead wire towards the outside, so that the latter generates said compressive force. In such a configuration, the presence of a bead wire of conventional type and the turning-up of the carcass beneath the latter are presented as being indispensable for generating the compressive force. This restricts the other types of arrangement which can be considered Moreover, EP 0 922 592 describes two embodiments with the carcass anchored by turning it up axially towards the outside. The first embodiment proposes anchoring of the carcass in the bead by turning it up radially towards the outside of the end of the carcass. The upturn is surrounded on either side by two radially superposed layers of metal wires arranged axially side by side and covering substantially all the axial portion along the seat of the bead. The layers are arranged so as to be parallel to the seat. The types of wires and the corresponding dimensions are very precise. The second solution proposed in this document relates to bead seats with different diameters. The carcass is also secured differently from the first solution. First of all, the carcass is subdivided into two portions which are radially separated at the level of the bead. Each portion is adjoined by a layer of wires which is arranged radially, each layer being arranged radially to the outside against each of the carcass portions. The radially outer carcass portion and the layer of wires radially to the inside are separated by an insert of the elastomer of high hardness type provided in the bead. This insert axially lines the central portion of the bead and rises radially towards the outside and axially towards the inside, beyond the radial limit of the presence of the metal wires.

The two examples of solutions in EP 0 922 592 have several disadvantages. Thus, the securing of the carcass proposed in this document requires the presence of an upturn axially towards the outside of the end portion of the carcass. Furthermore, the superposed layers of wires are arranged radially close to the seat of the bead, for a good part at a radial position closer to the axis of rotation than the upper portion of the flange on which the bead bears. Unless highly extensible wires are used, it is difficult to mount/demount the tire, due to the unfavourable radial position of the wires. It will also be noted that the stacks are oriented substantially parallel to the profile of the seat against which the bead bears. According to the second solution, the carcass is subdivided into two portions and an insert of high hardness is necessary to separate on one hand the layers of wires and on the other hand the two carcass portions. However, the carcass is not anchored in the insert. The form of the insert described is limitative.

Document WO 01/39999 describes an extended-mobility tire, each of the beads of which comprises an inverted seat, an anchoring zone, a bearing zone and a transition zone. Each of the zones taken in isolation and also all the zones together to some extent form an internal bead capable of effecting relative movements, such as, for example, of the angular or rotational type, relative to another zone, or relative to a virtual centre of pressure CP, or relative to the seat of the rim, etc.

Preferably, said bearing zone is substantially elongated. It is extended, for example, substantially along the seat of the bead. The transfer of forces upon rotation of the bottom zone of the axially inner portion towards the axially outer portion is thus possible, while maintaining bearing pressure against at least one portion of the seat of the bead. The transfer of the forces creates self-clamping of the toe of the bead against the rim.

The present invention proposes overcoming the various drawbacks inherent in the solutions detailed above, and in particular optimising the characteristics of the anchoring zones so as to have a beneficial effect on the performance, the endurance and the mounting/demounting characteristics.

To do this, it provides a tire for a vehicle wheel, comprising:
- two sidewalls spaced apart axially from each other, joined at their radially outer portions by a crown zone provided on its radially outer portion with a circumferential tread;
- beads, arranged radially to the inside of each of the sidewalls, each bead comprising a seat and an outer flange which are intended to come into contact with a suitable rim;
- a reinforcement structure extending substantially radially from each of the beads, along the sidewalls, towards the crown zone;
- at least one of said beads comprising:
    - a bead seat comprising a generatrix the axially inner end of which is located on a circle of diameter greater than the diameter of the circle on which the axially outer end is located;
    - an anchoring zone for the reinforcement structure in said bead, comprising an arrangement of circumferential cords arranged substantially adjacent to a portion of the reinforcement structure and comprising at least two stacks distributed on either side of the reinforcement structure, a bonding mix being arranged between the circumferential cords and the reinforcement structure, said bonding mix of the anchoring zone having a elasticity modulus at a deformation of 10% of less than 20 MPa and preferably between 10 and 20 MPa;
    - an axially outer zone arranged in the zone of the bead provided to be arranged between the rim hook and the anchoring zone, said zone being furnished by a rubber mix of elasticity modulus at a deformation of 10% substantially higher than that of said anchoring zone;
    - a bearing zone for said bead extending substantially along the seat of the latter.

Very surprisingly, the Applicant has noted that this anchoring rubber mix made it possible, in spite of its rigidity which is very much less than which was advocated previously, to retain the very satisfactory endurance properties of the beads in question.

Preferably, the bonding rubber mix comprises at least one synthetic elastomer included in the group of SBRs and polybutadienes with a total proportion of synthetic elastomer greater than 50% of the total weight of elastomers.

Preferably, the total proportion of synthetic elastomer is of between 55 and 65% of the total weight of elastomers.

Above 65%, the tack of the connecting rubbers becomes insufficient and this causes problems in building the beads of the tires; on the other hand, below 55%, the resistance of the anchoring rubber mixes to static creep stress at high temperature deteriorates.

The anchoring rubber mix preferably comprises an SBR of a Tg of between −70 and −25° C. with a proportion by weight greater than 20% of the total weight of elastomers.

It may also comprise a polybutadiene of a Tg of between −110 and −90° C. with a proportion by weight of less than 40% of the total weight of elastomers.

In fact, the presence of polybutadiene improves the thermal stability of the anchoring rubber mix at high temperature; however, beyond 40% of the total weight of elastomers, the anchoring rubber mix becomes difficult to produce.

The anchoring rubber mix advantageously withstands a static creep stress at 150° C. under an initial stress of 2.35 MPa for at least 5 hours without breaking.

Preferably, the anchoring rubber mix has an amount of static creep at 150° C. under an initial stress of 2.35 MPa of less than $2\times10^{-3}$/min for between 3 and 5 hours' applied stress.

Preferably, said anchoring rubber mix has an amount of reversion after 10 min at 197° C. of less than 10%.

Preferably, said anchoring rubber mix has an amount of reversion after 10 min at 197° C. of less than 5%.

The elasticity modulus at a deformation of 10% of the rubber mix of the external lateral zone is advantageously greater than 30 MPa and preferably greater than 40 MPa.

Preferably, the external lateral zone cooperates with the anchoring zone.

The rubber mix of the anchoring zone is advantageously in contact on one hand with the circumferential cords, and on the other hand with the carcass-type reinforcement structure.

The tire according to the invention advantageously comprises an anti-creep zone arranged at the level of the bead, substantially along the carcass-type reinforcement structure. The rubber mix of the anti-creep zone preferably has an elasticity modulus at a deformation of 10% greater than that of the mix of the anchoring zone. For example, the rubber mix of the anti-creep zone has an elasticity modulus at a deformation of 10% greater than 30 MPa and preferably greater than 40 MPa.

The carcass-type reinforcement structure is preferably formed of a cord winding extending back and forth between the two beads, forming loops in each of the beads. Furthermore, the cord winding is preferably formed of a single cord.

The anchoring zone does not comprise a bead wire, in particular a bead wire of conventional type, such as, for example, a multi-cord bead wire against which a carcass ply is turned up, such that the zone of cooperation between the upturned portion of the ply and the bead wire effects the holding of the carcass ply.

The reinforcement structure of the sidewalls and the crown is advantageously of the carcass type, its mechanical properties being similar to those of carcass plies of known type. Furthermore, this reinforcement structure is advantageously formed without axial separation at the level of the bead. Thus all the cords of the circumferential arrangement preferably occupy a substantially identical axial position.

The bearing zone is preferably substantially adjacent to the rim seat.

Preferably, the bearing zone is substantially formed of a rubber mix of high modulus.

The presence of a zone of rubber of high modulus in a radially inner portion relative to the flange provides good axial holding and prevents the bead from sliding axially towards the outside.

According to a particularly advantageous method of manufacture in which the various constituents of the tire are arranged directly on a central core, the shape of which imparts to the tire during manufacture a substantially similar shape to the shape of the finished product, dispensing with the upturn (which exists in a conventional structure) permits advantageous simplification of manufacture.

According to an advantageous form of embodiment of the invention, the bases of the stacks (the cords radially closest to the axis of rotation of the tire) are arranged radially farther to the outside than the end of said flange (axially and radially outermost portion of said flange). The bases of the stacks are advantageously provided so as to be arranged radially externally relative to the flange of the rim which is matched to the tire. The mounting/demounting operations are then facilitated.

Advantageously, the carcass-type reinforcement structure extends substantially radially from each of the beads, along the sidewalls, towards the crown zone. Said structure may thus be unitary and extend from one bead to the other, or alternatively be divided into two half-structures, each extending along a single sidewall.

The number of stacks and the number of windings or turns of each of the stacks is advantageously established according to the characteristics desired for the tire, for example its operating pressure. For example, a larger number of stacks may be desired in order to increase the rigidity at the level of the zone of the bead.

According to another advantageous variant, the inner bead intended to be arranged on the inner side of the wheel and the outer bead intended to be installed on the outer side of the wheel are arranged asymmetrically. Thus, for example, the number of stacks or the number of turns of each of the stacks may be different, for example so that the number of stacks of cords in the bead on the inside is different from the number of stacks of cords in the bead on the outside.

According to another aspect, the symmetry relates to the arrangements of the anchoring and bearing zones. Each of the beads may have different architectures in which, for example, the forms, arrangements and dimensions of one or more of the zones may vary. It is also possible to vary the constituent materials and the mechanical properties, such as for example hardness, just as it is possible to vary the number of zones.

Other characteristics and advantages of the invention will become apparent on reading the examples of embodiment of the tire according to the invention, which are given in non-limitative manner, with reference to the appended FIGS. 1 to 5, in which.

Figure 1:
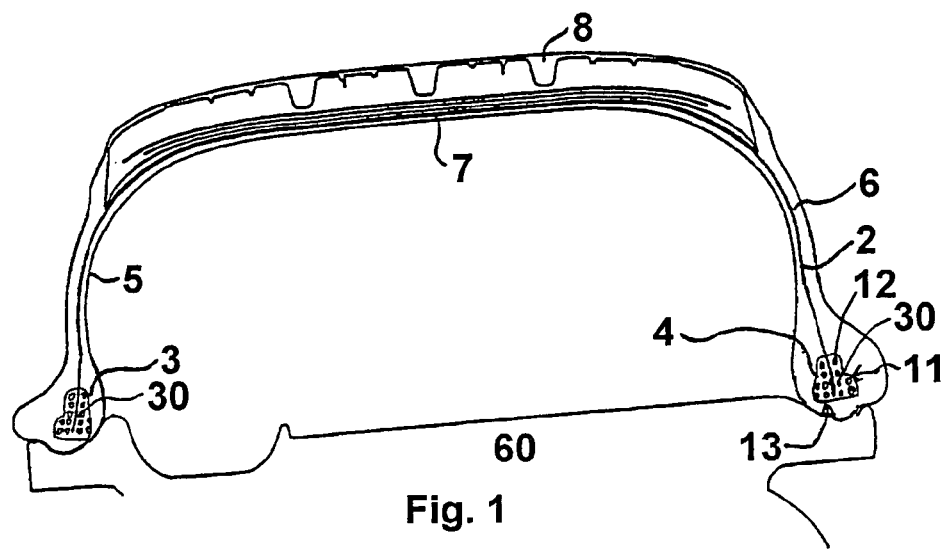
FIG. 1 shows, in cross-section, a tire according to the invention.

The reinforcement armature or reinforcement of the tires is currently—and most frequently—constituted by stacking one or more plies conventionally referred to as "carcass plies", "crown plies", etc. This manner of designating the reinforcement armatures comes from the manufacturing process, which consists of producing a series of semi-finished products in the form of plies, provided with cord reinforcing threads which are frequently longitudinal, which are subsequently assembled or stacked in order to build a tire blank. The plies are produced flat, with large dimensions, and are subsequently cut according to the dimensions of a given product. The plies are also assembled, in a first phase, substantially flat. The blank thus produced is then shaped to adopt the toroidal profile typical of tires. The semi-finished products referred to as "finishing" products are then applied to the blank, in order to obtain a product ready for vulcanisation.

Such a type of "conventional" process involves, in particular for the phase of manufacture of the blank of the tire, the use of an anchoring element (generally a bead wire), used for anchoring or holding the carcass reinforcement in the zone of the beads of the tire. Thus, in this type of process, a portion of all the plies constituting the carcass reinforcement (or only a part thereof) is turned up around a bead wire arranged in the tire bead. In this manner, the carcass reinforcement is anchored in the bead.

The fact that this conventional type of process is becoming more widespread in the industry, despite numerous variants in the manner of producing the plies and assemblies, has led the person skilled in the art to use a vocabulary modelled on the process; hence the generally accepted terminology, comprising in particular the terms "plies", "carcass", "bead wire", "shaping" to designate the change from a flat profile to a toroidal profile, etc.

However, there are nowadays tires which do not, properly speaking, comprise "plies" or "bead wires" in accordance with the preceding definitions. For example, document EP 0 582 196 describes tires manufactured without the aid of semi-finished products in the form of plies. For example, the cords of the different reinforcement structures are applied directly to the adjacent layers of rubber mixes, the whole being applied in successive layers on a toroidal core having a shape which makes it possible to obtain directly a profile similar to the final profile of the tire being manufactured. Thus, in this case, there are no longer any "semi-finished products", nor "plies", nor "bead wires". The base products, such as the rubber mixes and reinforcing threads in the form of cords or filaments, are applied directly to the core. As this core is of toroidal form, the blank no longer has to be shaped in order to move from a flat profile to a profile in the form of a torus.

Furthermore, the tires described in this document do not have the "conventional" upturn of the carcass ply around a bead wire. This type of anchoring is replaced by an arrangement in which circumferential filaments are arranged adjacent to said sidewall reinforcement structure, the whole being embedded in an anchoring or bonding rubber mix.

There are also processes for assembly on a toroidal core using semi-finished products specially adapted for quick, effective and simple laying on a central core. Finally, it is also possible to use a mixture comprising both certain semi-finished products to produce certain architectural aspects (such as plies, bead wires, etc), whereas others are produced from the direct application of mixes and/or reinforcing threads in the form of filaments.

In the present document, in order to take into account recent technological developments both in the field of manufacture and in the design of products, the conventional terms such as "plies", "bead wires", etc., are advantageously replaced by neutral terms or terms which are independent of the type of process used. Thus, the term "carcass-type reinforcing thread" or "sidewall reinforcing thread" is valid as a designation for the reinforcement cords of a carcass ply in the conventional process, and the corresponding cords, generally applied at the level of the sidewalls, of a tire produced in accordance with a process without semi-finished products. The term "anchoring zone", for its part, may equally well designate the "traditional" upturn of a carcass ply around a bead wire of a conventional process or the assembly formed by the circumferential filaments, the rubber mix and the adjacent sidewall reinforcement portions of a bottom zone produced with a process with application to a toroidal core.

Hereafter, the following definitions are used:

"reinforcing thread": both monofilaments and multifilaments, or assemblies such as cables, plied yarns or alternatively any equivalent type of assembly, and this whatever the material and the treatment of these reinforcing threads, for example surface treatment or coating or pre-sizing in order to promote adhesion to the rubber;

"contact" between a reinforcing thread and an anchoring rubber mix: the fact that at least part of the outer contour of the reinforcing thread is in intimate contact with the anchoring rubber mix; if the reinforcing thread comprises a covering or a coating, the term "contact" means that it is the outer contour of this covering or coating which is in intimate contact with the anchoring rubber mix;

"axial": a direction parallel to the axis of rotation of the tire; this direction may be "axially inner" when it is directed towards the inside of the tire and "axially outer" when it is directed towards the outside of the tire;

"radial": a direction passing through and perpendicular to the axis of rotation of the tire; this direction may be "radially inner" or "radially outer" depending on whether it is directed towards the axis of rotation of the tire or towards the outside of the tire;

"elasticity modulus" of a rubber mix: a secant modulus of extension at 10% deformation and at ambient temperature, the measurement being effected after a first accommodation cycle up to 10% deformation:

$$E_{10} = \frac{F_{10}}{S \times \varepsilon_{10}} \text{ i.e. } E_{10} = \frac{F_{10}(1 + \varepsilon_{10})}{S_0 \times \varepsilon_{10}} \text{ and } E_{10} = \frac{F_{10} \times 1.1}{S_0 \times 0.1}$$

in which $\varepsilon_{10}$ is equal to 0.1;

where $E_{10}$: secant modulus of extension at 10% deformation; $F_{10}$: force of extension at 10% extension; $S_0$: initial section of the test piece; S: section of the test piece at the deformation of extension $\varepsilon$; in the case of rubber material, it is known that:

$$S = \frac{S_0}{1 + \varepsilon};$$

and $\varepsilon_{10}$: deformation of extension at 10%.

"Tg" of an elastomer: the glass transition temperature thereof measured by differential thermal analysis;

"static creep test": a test in which test pieces are prepared, the useful part of which has a length of 70 mm, a width of 5 mm and a thickness of 2.5 mm (these test pieces are cut from vulcanised sheets of a thickness of 2.5 mm); the test pieces are placed in an oven at 150° C. and a 3 kg weight is immediately hung from them; the test is thus carried out with an initial stress of:

$$\sigma_0 = \frac{Mg}{S_0} = 2.35 \text{ MPa}$$

where M: weight applied, g: gravity acceleration and $S_0$ initial section of the test piece being measured; the elongation of the useful part of the test piece is measured as a function of time; the "amount of static creep" corresponds to the variation of deformation over a given time, for example between 3 and 5 hours of the test:

$$\tau = \frac{\Delta \varepsilon}{\Delta t}$$

where: $\Delta \epsilon = \epsilon(t_2) - \epsilon(t_1)$: variation in the deformation measured during a time interval $\Delta t = t_2 - t_1$ in minutes (min);

"rheometry test": an alternating shearing test at a deformation of ±0.2 degrees, a frequency of 100 cycles/min, a temperature of 197° C. and a duration of 10 min; rheometer from Monsanto; the test is performed on a disc of uncured mix, the change in the torque over the 10 min. resulting from the shearing imposed between the two faces of the disc is recorded; the change in the torque after the maximum measured will be particularly noted here: if the torque measured remains stable, there is no reversion, that is to say, reduction in the stiffness of the test piece; if the torque measured decreases, it indicates that there is reversion; the phenomenon of reversion results in a reduction in the rigidity of the test piece under the test conditions; it is a test of the thermal stability of the mix at high temperature;

$$r = \frac{C_{max} - C_{10}}{C_{max}} \times 100$$

denotes the amount of reversion at the end of the test; $C_{max}$ is the maximum torque measured and $C_{10}$ is the torque measured after 10 minutes' testing;

"a circumferentially oriented reinforcing thread": a reinforcing thread oriented substantially parallel to the circumferential direction of the tire, that is to say, forming with this direction an angle which does not diverge by more than five degrees from the circumferential direction; and "a radially oriented reinforcing thread": a reinforcing thread contained substantially within one and the same axial plane or in a plane forming with an axial plane an angle less than or equal to 10 degrees.

In the present description, the term "cord" very generally designates both monofilaments and multifilaments or assemblies such as cables, plied yarns or alternatively any equivalent type of assembly, whatever the material and the treatment of these cords. They may, for example, be surface treatments, coating or pre-sizing in order to promote adhesion to the rubber. The expression "unitary cord" designates a cord formed of a single element, without assembly. The term "multifilament", in contrast, designates an assembly of at least two unitary elements to form a cable, plied yarn etc.

On the other hand, "radial structure" is understood to mean an arrangement at 90 degrees, but also, in accordance with custom, at an angle close to 90°.

It is known that, conventionally, the carcass ply or plies is/are turned up about a bead wire. The bead wire then performs a carcass anchoring function. Thus, in particular, it withstands the tension which develops in the carcass cords for example under the action of the inflation pressure. The arrangement described in the present document makes it possible to provide a similar anchoring function. It is also known to use the bead wire of conventional type to provide a function of clamping the bead on a rim. The arrangement described in the present document also makes it possible to provide a similar clamping function.

In the present description, "bonding" rubber or mix is understood to mean the rubber mix possibly in contact with the reinforcement cords, adhering to the latter and capable of filling the interstices between adjacent cords.

"Sidewalls" refers to the portions of the tire, most frequently of low flexural strength, located between the crown and the beads. "Sidewall mix" refers to the rubber mixes located axially to the outside relative to the cords of the reinforcement structure of the carcass and to their bonding rubber. These mixes usually have a low elasticity modulus.

"Bead" refers to the portion of the tire adjacent radially internally to the sidewall.

Figure 2:
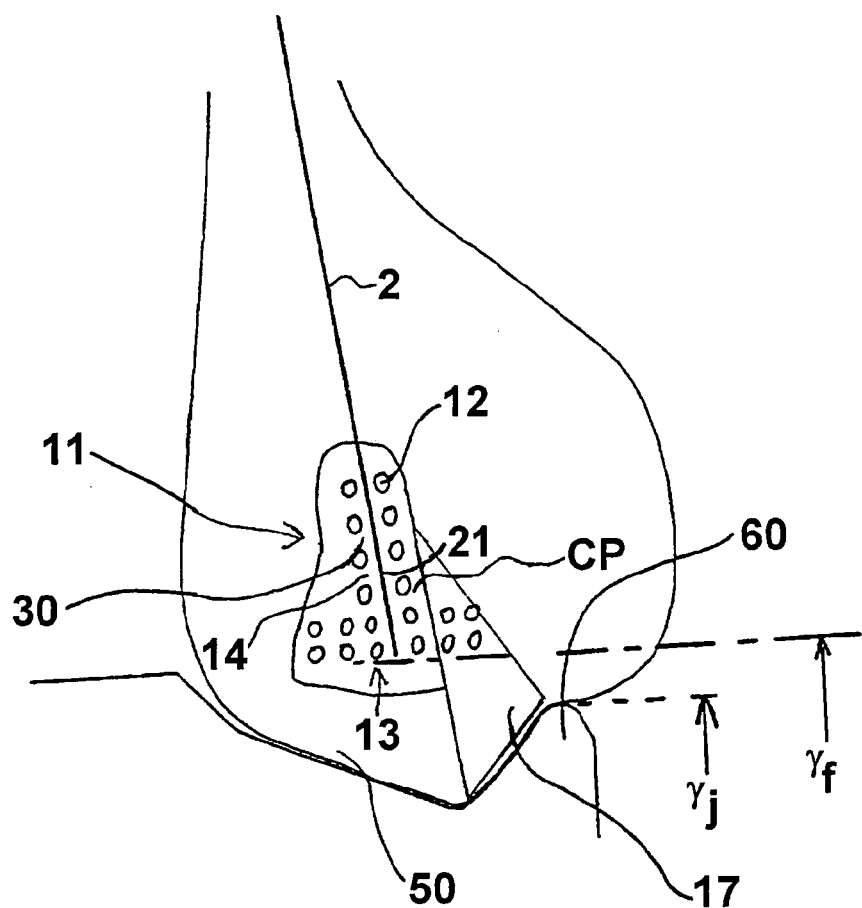
FIG. 2 shows, in an enlarged cross-section, a bead of a first variant of a tire according to the invention.

FIG. 1 shows, in cross-section, a tire 1 according to the invention. FIG. 2 makes it possible better to visualise certain elements of a bead of an example of embodiment of the invention. This tire comprises a first sidewall 5 adjacent to a first bead 3 which preferably corresponds to the inner bead. Similarly, the opposite portion of the tire comprises a second sidewall 6 adjacent to a second bead 4. A crown 7, on which there is provided a tread 8, forms the join between the sidewalls. The crown preferably comprises at least one reinforcement belt.

The tire comprises a carcass-type reinforcement structure 2, provided with reinforcing threads which are advantageously in a substantially radial configuration. This structure may be arranged continuously from one bead to the other, passing via the sidewalls and the crown, or alternatively it may comprise two or more parts, arranged for example along the sidewalls, without covering the entire crown.

The end portions 21 of the reinforcement structure 2 are located in the beads.

The reinforcement structure 2 can be formed by winding a single cord which extends back and forth between the two beads, forming loops in each of the beads. These loops, which are coated in the rubber mix, contribute to the mechanical bond between the reinforcement structure 2 and the bead, in particular the stacks 13. By the presence of loops between the "back" and "forth" sections of the cord, it can be seen that the reinforcement is of the monofilament type. Of course, it is possible for the carcass not to be produced in continuous manner from a single cord and it is possible for there not to be any loops, but, for example, free ends.

The bead furthermore comprises an anchoring zone 30 which is substantially circumferential and comprises an arrangement of circumferential cords 12 disposed substantially adjacently to a portion of the reinforcement structure, and comprises at least two stacks distributed on either side of the reinforcement structure, a bonding (or anchoring) mix 14 being arranged between the circumferential cords and the reinforcement structure.

In the anchoring zone, at least one cord 12 of one of the stacks 13 is preferably arranged in the immediate vicinity of a portion 21 of the reinforcement structure 2. The stacks may also be arranged such that a portion 21 is inserted between stacks 13.

In the anchoring zone, the space between the cords 12 and the reinforcement structure 2 is occupied by a bonding rubber mix 14. The anchoring or bonding rubber mix 14 is arranged on either side of the reinforcement structure between this structure and the circumferential windings 12. This anchoring rubber mix 14 is in direct contact with at least one portion of the contour on one hand of the reinforcement elements of the structure 2 and on the other hand of the cords 12 present in the anchoring zone. In the example shown, the anchoring rubber mix is in contact with all the cords or reinforcing threads arranged in the anchoring zone, and fills the gaps between them. This direct contact between the anchoring rubber mix 9 and the reinforcement elements in the anchoring zone is essential for there to be good mechanical cooperation between the circumferential cords and the anchoring rubber mix for securely anchoring the elements of the reinforcement structure 2 in the anchoring zone of the bead and taking up the forces to which these elements are subjected due in particular to the inflation pressure of the tire. The anchoring rubber mix has as its main mechanical property excellent creep resistance associated with an elasticity modulus of between 10 and 20 MPa.

The cords 12 are substantially inextensible and may be metal cables. The elements of the structure 2 may conventionally be textile reinforcing threads of high elasticity modulus, such as aramid reinforcing threads.

The arrangements of cords 11 may be laid out and manufactured in various ways. For example, a stack 13 may advantageously be formed of a single cord 12, wound (substantially at zero degrees) in a spiral, preferably from the smallest diameter towards the largest diameter. A stack may also be formed of a plurality of concentric cords laid one in another.

Figure 3:
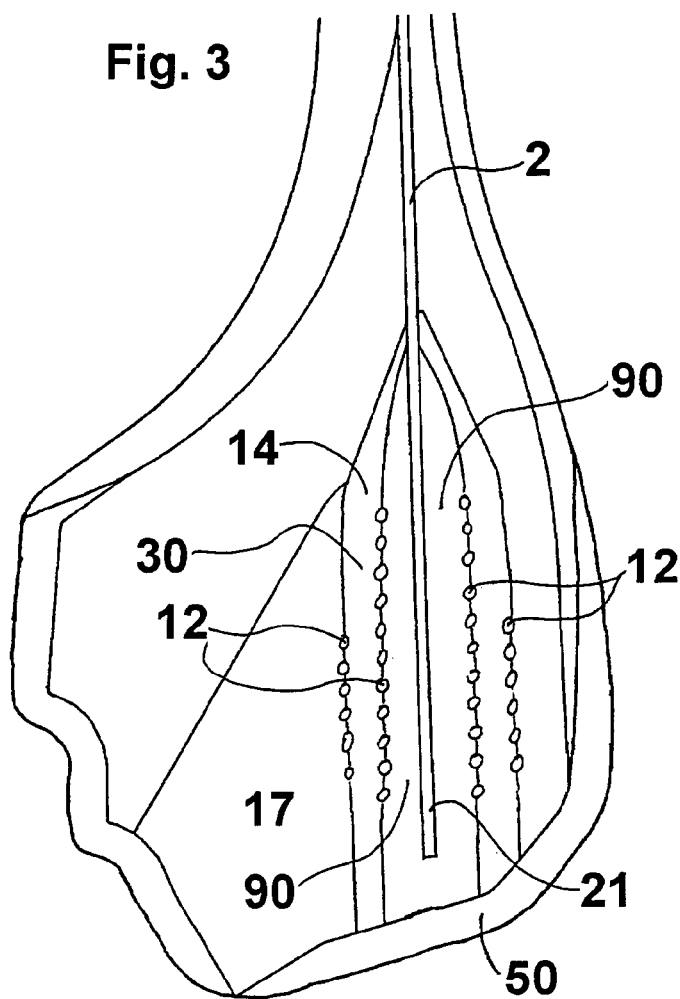
FIG. 3 shows, in an enlarged cross-section, a bead of a second variant of a tire according to the invention.

In the example of embodiment illustrated in FIG. 3, the tire comprises an anti-creep zone 90 arranged at the level of the bead, substantially along the carcass-type reinforcement structure. In the example illustrated, this zone extends between the reinforcement structure 2 and the first stack 13 adjacent to the structure 2, preferably on either side of the structure 2. The rubber mix of the anti-creep zone has an elasticity modulus at a deformation of 10% greater than that of the mix of the anchoring zone, for example greater than 30 MPa and even preferably greater than 40 MPa. The anti-creep properties of the mix used in this zone dominate.

The bead also comprises a bearing zone 50, arranged substantially between the anchoring zone and the seat of the bead, substantially aligned axially with these zones, said zone being suitable for subjecting to compression upon mounting of the tire on a suitable rim. This compression contributes to ensuring the clamping of the tire, by transmitting the clamping force produced by the clamping zone. The rubber mix of this zone is selected so as to provide good creep resistance, in order to ensure the durability of the clamping characteristics.

An external lateral zone 17 is provided in the zone of the bead intended to be arranged between the rim flange or hook 60 and the anchoring zone. This zone is preferably furnished with a rubber mix of substantially high modulus, for example of between 10 and 40 MPa.

This zone makes it possible to increase the clamping pressure, in particular in the region of the rim hook. Thanks to the limited deformability of the zone, it makes it possible to limit the tendency of the bead to slip radially outwards beyond the rim hook. It furthermore contributes, on the one hand, to the inhibition of any tendency to generate a rotational moment and, on the other, to establish dynamic stability, such as for example when cornering or on exposure to major lateral stresses.

Advantageously, the external lateral zone 17 is provided in the axially outer portion of the bead and extends between the portion adjacent to the rim hook and the anchoring zone. Advantageously, it cooperates with the anchoring zone, which permits a better mechanical action between said anchoring zone and the portion of the bead adjacent to the rim hook.

The tire according to the invention is particularly suitable for use on a rim of the type described in EP 0 673 324. Such a rim comprises a seat and preferably a raised area or flange located axially and radially towards the outside.

The bases of the stacks (the cords radially closest to the axis of rotation of the tire) are preferably arranged radially farther to the outside than the end of said flange (axially and radially outermost portion of said flange), as illustrated, for example, in FIG. 2. The bases of the stacks are advantageously provided so as to be arranged radially externally relative to the flange of the rim 60 (or rim hook) which is matched to the tire. The mounting/demounting operations are then facilitated. Thus, in FIG. 2, it will be seen that $r_f$ (radius of the first cords) is greater than $r_j$ (radius of the rim flange or hook). This radius corresponds to the distance from the axis of rotation.

The different examples of embodiment described and/or illustrated may advantageously be produced using devices of the types described in EP 0 580 055.

Thus, for example, it is very advantageous to build the tire on a central core which imposes the shape of its internal cavity. There are applied to this core, preferably in the order required by the final architecture, all the constituents of the tire, which are arranged directly in their final position, in a substantially final profile. In this case, such a tire can be moulded and vulcanised as set forth in U.S. Pat. No. 4,895,692.

Figure 4:
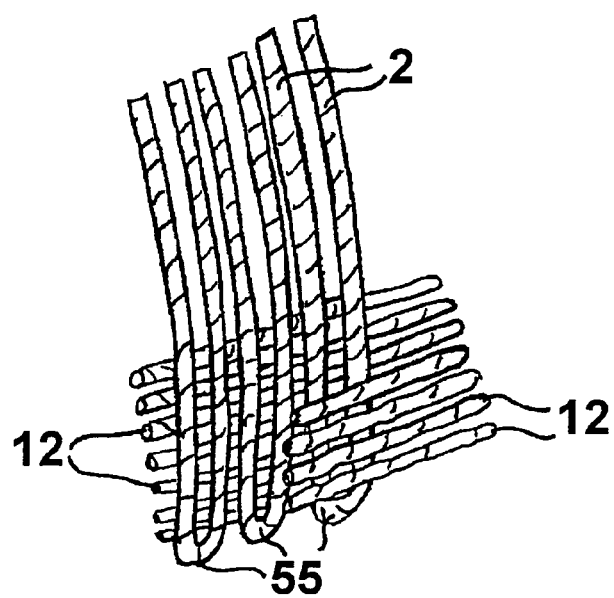
FIG. 4 is a perspective view, illustrating diagrammatically the arrangement of part of the reinforcing threads.

FIG. 4 is a perspective view specifying the relative arrangements of the different reinforcing threads in one of the embodiments of the tire beads of the invention. Only the reinforcement elements are shown in this figure. There can be seen the circumferential alignment of reinforcing threads of the carcass-type reinforcement structure. At their radially lower ends, the portions of cord form juxtaposed loops 55, located in the bead. These loops 55 are adjacent and do not overlap. On either side axially of the carcass-type reinforcement structure, there are shown adjacent cords 12.

In a variant, many other embodiments for in particular the carcass-type reinforcement structure may be used. By way of example, instead of using a continuous cord forming loops in the bead, individual cords laid successively or in groups of several forming a strip may be used.

The anchoring or bonding rubber mix according to the invention therefore has as essential mechanical properties a rigidity such that its modulus of extension at 10% deformation is of between 10 and 20 MPa, excellent creep resistance at high temperature and very good stability at high temperature. The rigidity selected imparts to the bead structures described sufficient flexibility to make it possible to effect easily the mounting and demounting of the tires, even those of large dimensions, on/from their operating rims without adversely affecting the endurance performance; the creep resistance is essential to obtain solid and durable anchoring of the carcass reinforcements in the beads and the thermal stability at high temperature is also important owing to the very harsh thermal conditions to which some tire beads may be subjected during operation.

Experimentation has shown that, in order to obtain good endurance results, an anchoring rubber mix containing a synthetic SBR elastomer of a Tg of between $-70$ and $-30°$ C., used alone or coupled with polybutadiene, may be used. Preferably the polybutadiene has a Tg of between $-110$ and $-90°$ C. The synthetic elastomer(s) is/are used in a total proportion of at least 50% of the total weight of elastomers, the balance being formed by natural rubber. The anchoring rubber mix additionally contains reinforcing fillers such as carbon black and a vulcanisation system appropriate for obtaining the desired rigidity. The cords 12, in the examples shown, are brass-coated metal cables. It is therefore preferable for the anchoring rubber mix to have a large content of sulphur and to contain additives promoting adhesion to the brass (for example cobalt or nickel metal salts). For example, a content of sulphur of between 5 and 8% of the total weight of elastomer and a content of carbon black of between 60 and 70% of the total weight of elastomer are used. Carbon black N347 may be preferably used.

Four mixes were produced and tested to illustrate the characteristics of the anchoring rubber mixes according to the invention.

The main components of the formulation of these mixes are found in the table below.

| Products | 1 | 2 | 3 | 4 |
|---|---|---|---|---|
| CN | 100 | 80 | 40 | 40 |
| SBR2300 | 0 | 10 | 30 | 60 |
| BR113 | 0 | 10 | 30 | 0 |
| N347 | 62 | 62 | 62 | 62 |
| Sulphur | 7 | 7 | 7 | 7 |

These four mixtures were tested thus:
rigidity: determination of the elasticity modulus at 10% extension and ambient temperature,
creep: static creep test at 150° C. for 7 hours as described previously, and
thermal stability: rheometry test at 197° C. for 10 min as described previously.

| Test | 1 | 2 | 3 | 4 |
|---|---|---|---|---|
| Elasticity modulus | 10.6 | 11.8 | 11.6 | 13.0 |
| Creep test | Rupture after 30 min | Rupture after 60 min | OK | OK |
| T | — | — | $1 \times 10^{-3}$/min | $0.6 \times 10^{-3}$/min |
| R | 35% | 26% | 1.5% | 7.7% |

The four mixtures have satisfactory rigidity.

Figure 5:
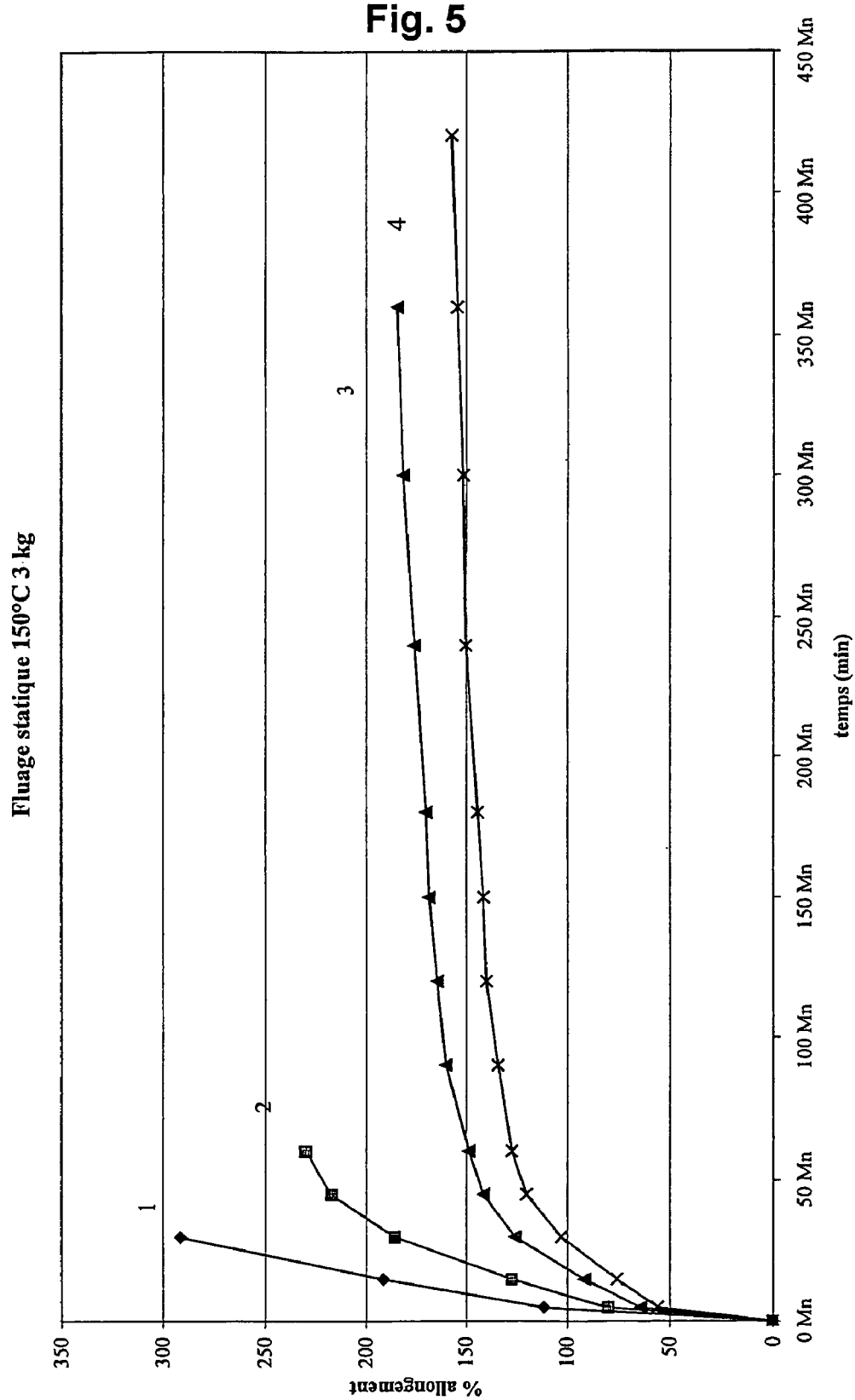
FIG. 5 shows results of static creep tests.

FIG. 5 illustrates the results of static creep tests for these four mixtures. The mix 1, based solely on natural rubber, has a static creep resistance at high temperature which is completely inadequate. Breaking of the test pieces was observed after 30 minutes' testing. Its thermal stability is also not satisfactory, since the mix has a very marked amount of reversion.

Mix 2 has improved results compared with the first, but is not satisfactory either.

Mixes 3 and 4 successfully pass the static creep and rheometry tests. Their creep resistance is entirely correct, and their thermal stability at high temperature too. Mix 3, which comprises three elastomers, has a slightly more satisfactory reversion result than mix 4.

Tire tests were also carried out with anchoring rubber mixes of formulations similar to the mixes of the test. The tires exhibited a correct aptitude for the mounting and demounting operations, but only those comprising an anchoring rubber mix corresponding to the formulations of mixes 3 and 4 exhibited sufficient endurance of the anchoring of the carcass-type reinforcement structure in the beads.

By way of limitation, it should be noted that the tires according to the invention may advantageously be built using a process which does not involve any, or only a slight, transformation of form in the uncured state. For example, the blank of the future tire can be assembled on a central core which imposes the form of its inner cavity. There are applied to this core, in the order required by the final architecture, all the constituents of the tire, which are arranged directly in their final position, without undergoing shaping at any moment of the building operation. This building may in particular use the devices described in Patent EP 0 243 851 for the laying of the reinforcing threads of the carcass reinforcement and in Patent EP 0 264 600 for the laying of the rubber compositions. The tire can then be moulded and vulcanised as set forth in U.S. Pat. No. 4,895,692.

The invention claimed is:

1. A tire for a vehicle wheel, comprising:
    two sidewalls spaced apart axially from each other, joined at their radially outer portions by a crown zone provided on its radially outer portion with a circumferential tread;
    beads, arranged radially to the inside of each of the sidewalls, each bead comprising a seat and an outer flange which are intended to come into contact with a suitable rim;
    a reinforcement structure extending substantially radially from each of the beads, along the sidewalls, towards the crown zone;
    at least one of said beads comprising:
        a bead seat comprising a generatrix the axially inner end of which is located on a circle of diameter greater than the diameter of the circle on which the axially outer end is located;
        an anchoring zone for the reinforcement structure in said bead, comprising an arrangement of circumferential cords arranged substantially adjacent to a portion of the reinforcement structure and comprising at least two stacks distributed on either side of the reinforcement structure, a bonding mix being arranged between the circumferential cords and the reinforcement structure, said bonding mix of the anchoring zone having a elasticity modulus at a deformation of 10% of less than 20 MPa and preferably between 10 and 20 MPa;
        an axially outer zone arranged in the zone of the bead provided to be arranged between the rim hook and the anchoring zone, said zone being furnished by a rubber mix of elasticity modulus at a deformation of 10% substantially higher than that of said anchoring zone;
        a bearing zone for said bead extending substantially along the seat of the latter.

2. The of tire claim 1, in which said bonding rubber mix comprises at least one synthetic elastomer included in the group of SBRs and polybutadienes with a total proportion of synthetic elastomer greater than 50% of the total weight of elastomers.

3. The tire of claim 2, in which the total proportion of synthetic elastomer is of between 55% and 65%.

4. The tire of claim 1, in which the anchoring rubber mix comprises an SBR of a Tg of between −70 and −25° C. with a proportion by weight greater than 20% of the total weight of elastomers.

5. The tire of claim 1, in which the anchoring rubber mix comprises a polybutadiene of a Tg of between −110 and −90° C. with a proportion by weight less than 40% of the total weight of elastomers.

6. The tire of claim 1, in which the anchoring rubber mix withstands without breaking a static creep stress at 150° C. under an initial stress of 2.35 MPa for at least 5 hours.

7. The tire of claim 1, in which said anchoring rubber mix has an amount of static creep at 150° C. under an initial stress of 2.35 MPa of less than $2 \times 10^{-3}$/min between 3 and 5 hours' stress.

8. The tire of claim 1, in which said anchoring rubber mix has an amount of reversion after 10 min at 197° C. of less than 10%.

9. The tire of claim 8, in which said anchoring rubber mix has an amount of reversion after 10 min at 197° C. of less than 5%.

10. The tire of claim 1, in which the elasticity modulus at a deformation of 10% of the rubber mix of the external lateral zone is greater than 30 MPa and preferably greater than 40 MPa.

11. The tire of claim 1, in which the external lateral zone cooperates with the anchoring zone.

12. The tire of claim 1, in which the rubber mix of the anchoring zone is in contact on one hand with the circumferential cords, and on the other hand with the carcass-type reinforcement structure.

13. The tire of claim 1, furthermore comprising an anti-creep zone arranged at the level of the bead, substantially along the carcass-type reinforcement structure.

14. The tire of claim 13, in which the rubber mix of the anti-creep zone has an elasticity modulus at a deformation of 10% greater than that of the mix of the anchoring zone.

15. The tire of claim 13, in which the rubber mix of the anti-creep zone has an elasticity modulus at a deformation of 10% greater than 30 MPa and preferably greater than 40 MPa.

* * * * *